(12) United States Patent
Hofmann et al.

(10) Patent No.: US 6,328,876 B1
(45) Date of Patent: Dec. 11, 2001

(54) METHOD FOR PRODUCTING A FILTER

(75) Inventors: Wilfried Hofmann; Tschangiz Scheybani, both of München (DE)

(73) Assignee: NFT Nanofiltertechnik Gesellschaft mit beschankter Haftung (DE)

( * ) Notice: Subject to any disclaimer, the term of this patent is extended or adjusted under 35 U.S.C. 154(b) by 0 days.

(21) Appl. No.: 09/463,896

(22) PCT Filed: Jul. 27, 1998

(86) PCT No.: PCT/EP98/04699

§ 371 Date: Jan. 28, 2000

§ 102(e) Date: Jan. 28, 2000

(87) PCT Pub. No.: WO99/05344

PCT Pub. Date: Feb. 4, 1999

(30) Foreign Application Priority Data

Jul. 28, 1997 (DE) .............................................. 197 32 476

(51) Int. Cl.⁷ ...................................................... C25F 3/12
(52) U.S. Cl. ........................ 205/655; 205/656; 205/674; 205/666
(58) Field of Search .................... 205/655, 666, 205/656, 674

(56) References Cited

U.S. PATENT DOCUMENTS

| | | | |
|---|---|---|---|
| 4,369,099 | * 1/1983 | Kohl et al. .................. | 205/655 X |
| 4,874,484 | 10/1989 | Foell et al. .................. | 204/129.3 |
| 5,139,624 | 8/1992 | Searson et al. .............. | 204/129.3 |
| 5,262,021 | 11/1993 | Lehmann et al. ............ | 204/129.55 |
| 5,348,627 | 9/1994 | Propst et al. ................ | 204/129.3 |
| 5,454,915 | * 10/1995 | Shor et al. .................. | 205/655 X |
| 5,690,807 | * 11/1997 | Clark, Jr. et al. ........... | 205/655 |

FOREIGN PATENT DOCUMENTS

| | | |
|---|---|---|
| 27 08 322 A1 | 8/1978 | (DE) . |
| 40 12 453 A1 | 10/1991 | (DE) . |
| 41 16 392 A1 | 11/1992 | (DE) . |
| 42 02 454 C1 | 7/1993 | (DE) . |
| 0 296 348 | 12/1988 | (EP) . |

* cited by examiner

*Primary Examiner*—Donald R. Valentine
(74) *Attorney, Agent, or Firm*—Senniger, Powers, Leavitt & Roedel (57) ABSTRACT

A method for producing a filter includes the steps of providing a blank of etchable semiconductor material having a first side and a second side and affixing a holding element to the blank. The holding element is chemically resistant to an etching solution. A current source is connected to the blank and at least one of the first and second sides of the blank is illuminated with light. The holding element and the blank are immersed in the etching solution until the first side of the blank is wetted so that the first side is etched electrochemically. The holding element is affixed to the blank such that contact areas between the holding element and the blank remain free of the etching solution.

12 Claims, 10 Drawing Sheets

METHOD FOR PRODUCING A FILTER

BACKGROUND OF THE INVENTION

The invention concerns a process for the production of a filter.

Such a process is known from U.S. Pat. No. 5,139,624. In this process, the filter is produced by etching a p- or n-doped silicon blank. The silicon blank forms the underside of a vessel, filled with etching liquid, wherein an O-ring and a pressure clamp, which press the silicon blank against the vessel, are provided for the sealing. During the etching process, the silicon blank is connected to the anode of a current source, and a cathode is immersed in the etching liquid. The silicon blank thus forms a "working electrode," which is electrochemically perforated as a function of the doping, the current density, and the composition of the etching liquid.

DE 4202454 C1 describes a similar etching process, in which an n-doped silicon disk is additionally radiated with light for the purposeful production of minority charge carriers. The minority charge carriers move to the side of the silicon disk, which is wetted with etching liquid—preferably to the surface recesses, on which the electrical field strength is increased and the etching erosion is particularly strong. Holes are formed at these places and their formation can be influenced by the illumination.

U.S. Pat. No. 5,348,627 describes a semiconductor etching process, in which lenses or other optical devices, such as reflecting or partially absorbing masks, are also provided, through which the irradiation of the silicon blank can take place. The masks are used for the production of collimated irradiation, and the lenses, for the variation of the light intensity. The optical devices are therefore used for the purposeful "control" of the direction of the light rays, wherein it becomes possible for only certain "zones"—that is, for only certain partial areas of the silicon blank which are to be etched, to be irradiated, which involves a great technical outlay.

A similar etching process for the production of holes or pits in n-doped silicon is described in EP 0 296 348 A1, in which the substrate is also connected as an anode, is located on the underside of a vessel filled with a hydrofluoric acid-containing electrolyte, and is irradiated with light.

With the process of the state of the art, in which the blank to be etched is located on the underside of the etching vessel, a sealing of the chemically very aggressive etching liquid is difficult and involves an undesired great outlay and high costs.

In such arrangements, the case may also arise that on the boundary areas of the blank, the etching takes place at an angle to the surface, which is undesirable. In order to obtain a filter surface of a defined size, the boundary areas must be cut off after the etching treatment, wherein the production expense is further increased.

Another problem, which appears, in particular with the mass or serial production of filters, is the maintenance of identical production parameters—that is, the production of filters with identical characteristics (pore diameter, surface density of the pores, filter area, etc.). With the other processes, namely, the finished filter must be removed from the etching vessel. This requires an emptying and a subsequent refilling of the vessel, which is not desired with regard to the maintenance of constant process parameters.

Other filters for the separation of various substances in media, such as fluids, are, for example, membrane filters, network filters, deep-bed filters, or ultrafilters, which are made, for example, of mixtures of cellulose acetate and cellulose nitrate, cellulose polymers, woven nylon or metal threads, metallic silver, glass fibers, and microglass fibers.

The disadvantage with these filters is that they do not have an exactly defined hole structure and in particular, their pore diameters are not clearly defined. Liquid is kept in channel-like structures of the filter due to surface tension and when using a certain pressure, the liquid is expelled. In the so-called bubble test for the integrity test of filters, the corresponding formula is as follows:

$$P = \frac{K \cdot 4\sigma \cos\theta}{d}$$

P: Bubble point pressure
d: Diameter of the pores
K: Shape correction factor
è: Angle of contact between the liquid and the solid
ó: Surface tension The pore diameter d goes into this experimentally obtained formula. From the formula, it is clear, however, that the influence of the other parameters leads, nevertheless, to undesirable substances or particles with dimensions that are larger than the approximation value d for the hole diameters passing through the filter.

Another disadvantage of the known filters is that they are not resistant chemically and are attacked, for example, by diverse acids, such as concentrated nitric acid, concentrated sulfuric acid, or concentrated hydrochloric acid, numerous solvents, such as, among others, methylene chloride, perchloroethylene, etc., and gases, such as ozone, which renders their use problematic or in some application cases, impossible.

Furthermore, many known filters are also not temperature-resistant. For example, traditional membrane filters made of polyvinyl dichloride can be autoclaved only up to ca. 130° C. according to the manufacturer's data. Nylon network filters are resistant between −45° C. and +115° C. only when dry, but not during the filtration. Isopore membrane filters are temperature-resistant only up to ca. 140° C.

Moreover, the costs of such filters rise considerably with the filter diameter in a direction transverse to the flow direction of the fluid.

SUMMARY OF THE INVENTION

The goal of the invention is therefore to indicate a process for the production of filters which makes possible a series production with defined filter surface size, a constant and exactly definable hole diameter, and, if especially desired, uniformly distributed or structured hole configurations, and is a process which can be used at low cost. The filters should have good chemical resistance and good temperature resistance.

The basic principle of the invention consists in an electrochemical etching process, in which a weak n- or p-doped semiconductor, and in particular, silicon, is connected as an anode or cathode, depending on the doping, and is etched with an etching solution, wherein a holding element is affixed to the semiconductor, with this element being chemically resistant with respect to the etching solution. For the etching, the semiconductor affixed to the holding element is immersed in the etching liquid, until one side of the semiconductor is wetted with etching liquid. The holding element "bounds" hereby the area of the semiconductor wetted by the etching liquid—that is, an arbitrarily "sharply delimited" filter area can be produced by the shape of the holding element.

The electrolytic etching is based on the fact that the electrical field in the doped semiconductor is "bent" by even the smallest recesses or irregularities in the planar surface of the blank toward their peaks or bottoms. Minority charge carriers follow the electrical field, which leads to the etching taking place primarily on the bottoms or peaks of the recesses. The etching of the existing recesses is therefore preferred and creates well-defined channels in the blank.

Minority charge carriers can be produced by illumination with a light source, which can be constant or is controllable. The current flowing in the blank or the concentration of the minority charge carriers is thus dependent on the intensity of the illumination. By adjusting the process parameters:
etching time
concentration of the etching solution
doping of the blank
applied potential
intensity of the illumination,
it is possible to adjust the distribution of the individual channels and their diameters. Depending on the doping, one attains channel diameters down to 1–2 nm. The doping substance concentration of the weakly doped silicon is thereby in the range of $10^{15}$ to $10^{18}$ cm$^{-3}$. With doping substance concentrations greater than $10^{19}$ cm$^{-3}$, channel diameters of a few nanometers down to the micrometer range can be obtained.

In the nanoporous range with channel diameters smaller than 2 nm, it is possible to produce disordered geometric arrangements, which, however, does not bring any disadvantages for many filter purposes. Beyond the macroporous range, which is above 50 nm, a perforation structure in a geometrically ordered arrangement is obtained.

According to a refinement of the invention, several filters can be etched simultaneously, wherein either several semiconductors with correlated holding elements can be used, or one semiconductor, which is subdivided into several "filter parcels" by a correspondingly shaped holding element. This makes possible the maintenance of identical process or filter parameters, which is of special importance, for example, in application fields such as medical technology, food or space technology.

According to another refinement of the invention, the holding element is shaped in such a manner that with reference to the light source, it has the function of a "shield" or a reflector. The shield or reflector can be combined, as one piece, with the part of the holding element affixed to the blank or it can be a separate part. The holding element can be rectangular, for example, or have the form of a circular cylinder or a paraboloid, in which the light source is located. Preferably, this holding element is metallized "inside" by a silver or aluminum coating. In using a parabolic holding element, axis-parallel light rays can be produced by an arrangement of the light source in the focal point, wherein a very uniform illumination of the blank is attained. Such reflectors also prevent an undesired light scatter and make possible the use of simple, low-cost light sources.

Several holding elements or shields can also be situated, next to one another, on one and the same blank, which makes possible the production of several filter zones with different filtering characteristics. Alternately, it is also possible to "box into one another" several such shields or reflectors, wherein, for example, filter parcels, boxed into one another annularly, can be produced, which have different pore diameters.

According to one refinement of the invention, a chemical etching can be carried out before the electrolytic etching, in which the recesses in the surface of the blank, needed for the electrolytic etchings, are prespecified. The chemical etching can be carried out with the aid of a perforation mask. It is not absolutely necessary, however, since the surface structures of semiconductors are never completely even.

After the etching treatment of the blank, it can be broken down, for example, by cutting into individual pieces. The blanks with hole structures, thus formed, are subsequently connected with traditional holding elements, so as to create a structure that can be used in a conduit with an arbitrarily shaped cross section.

Silicon, in particular, and preferably, monocrystalline silicon, is suitable as the material for the blank. Other semiconductor materials can also be used, however. As materials for the holding element, one can use, for example, polyethylene, platinum, polytetrafluoroethylene, fluorine-containing synthetic rubber, or the like, which are chemically resistant with respect to the etching solution.

As the etching solution, a hydrofluoric solution, for example, with a weight fraction of hydrofluoric acid on the order of magnitude of 1–50% can be used. A solution with a hydrofluoric acid fraction of 2–25% is particularly suitable. Other equally suitable solutions are described in U.S. Pat. Nos. 5,348,627 and 5,139,624.

According to one refinement of the invention, the holding element for the blank can be affixed to one or both sides of the blank, already before the etching, wherein the holding element can be shaped in accordance with the later application purpose or according to the installation conditions of the filter. The material for the holding element must be resistant merely against the etching agent. In this way, the number of production steps can be reduced, which saves time and reduces costs.

The following advantages are attained with the invention:

Filters with exactly defined diameters and wall structures of the pores can be produced, wherein an exactly defined filtering effect—that is, an exact particle separation—is obtained. The separated particles, which remain on the surface of the filter, can be investigated on the substrate surface, perhaps after removal of the filter from a conduit. The filters are very resistant chemically. In particular, a good resistance against acids exists when using silicon. The filter has a high temperature resistance. Thus, for example, silicon permits temperatures up to 1000° C. and more. Therefore, temperature fluctuations, which can appear in the course of a filtering, can also be tolerated within a greater temperature range, without disadvantage for the filter and its filtering effect. With traditional filters, the filtering function exists only up to ca. 100° C.

The production is low-cost and simple. Silicon is a cheap material which is simple to process. Moreover, one has a great freedom of selection with respect to the blank material. Thus, compact filters with extremely small channel diameters, which can be defined according to wish, can be produced, in accordance with the invention, in a uniformly or even structurally distributed arrangement. Application areas are the following, for example:

Air filtration in clean rooms in the production of chips; thus, particles with a diameter smaller than 0.2 $\mu$m can be separated, which improves the production of chips with extremely small conductor structures;

filtration in the field of medicine (for example, blood particles), microbiology/biochemistry, exhaust gas technology in traffic, aviation, and space travel;

cell fractionation;

DNA elution;
and many others.

The invention will be explained below, in more detail, with the aid of an exemplified embodiment in connection with the drawing.

BRIEF DESCRIPTION OF THE DRAWINGS

Corresponding reference characters indicate corresponding parts throughout the drawings.

DETAILED DESCRIPTION OF THE PREFERRED EMBODIMENT

Figure 1:
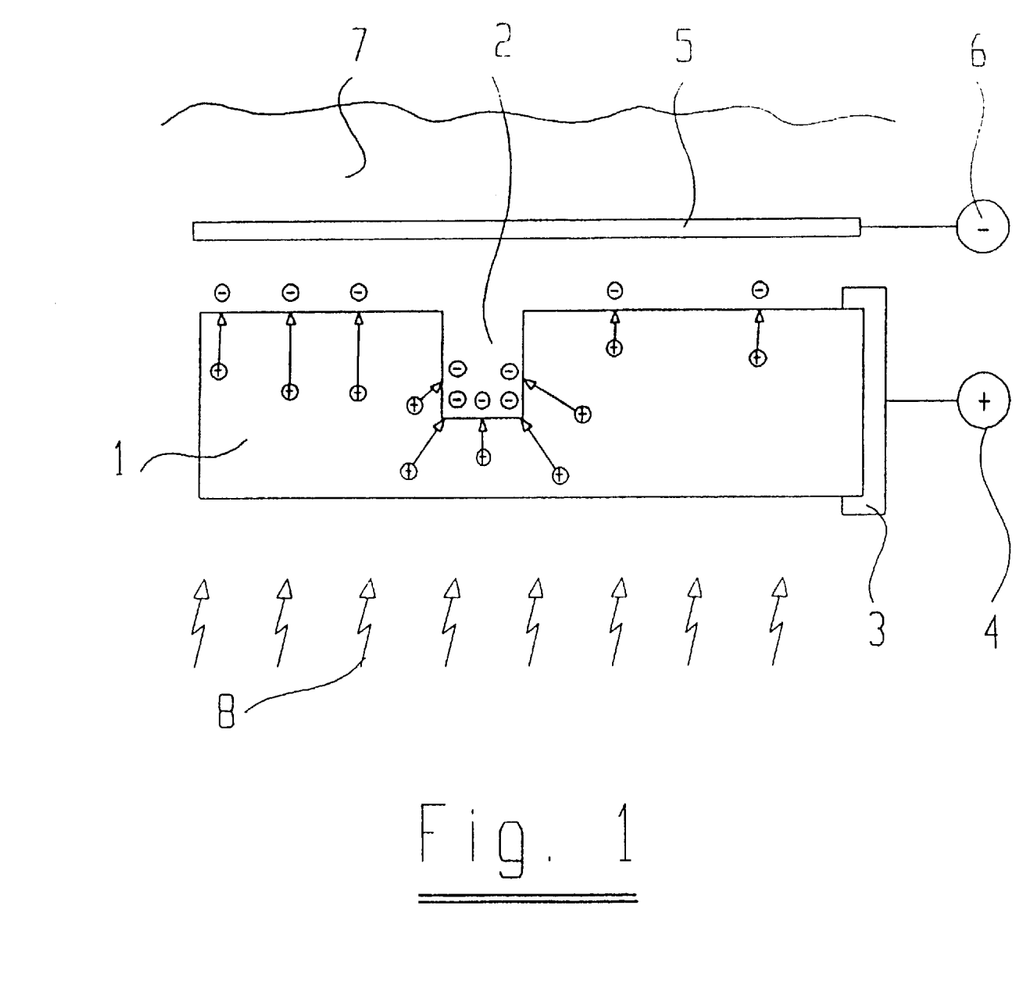
FIG. 1, a diagrammatic sketch to explain the etching process.

FIG. 1 shows a blank 1 in the shape of a silicon plate, which is weakly n-doped and has a recess 2 on its surface. The blank 1 is connected with the anode 4 of a current source, via an electrically conductive holding element 3. A counterelectrode 5 is connected with the cathode 6 of the current source. The field line density in the area of the recess 2 is greater than in the other areas due to the field line density which is being formed. For this reason, the charge carriers of the etching solution, marked with –, preferably arrive at the bottom of the recess 2, wherein the etching effect of the etching solution 7, which attacks on the upper side of the blank 1, is strengthened at these sites. The minority charge carriers in the blank 1, marked with +, are produced by an illumination of the underside, which is indicated by the light arrows 8. The illumination can be constant or variable.

The blank is n-doped with a concentration of $10^{15}$ cm$^{-3}$ to $10^{19}$ cm$^{-3}$. The constant or chronologically variable, applied potential or the anode etching current is a few mA/cm$^2$. The etching solution has a fluoride content of ca. 10%.

The etching process is carried out until the recess 2 is etched completely through the blank and thus a through-hole is formed.

Figure 2:
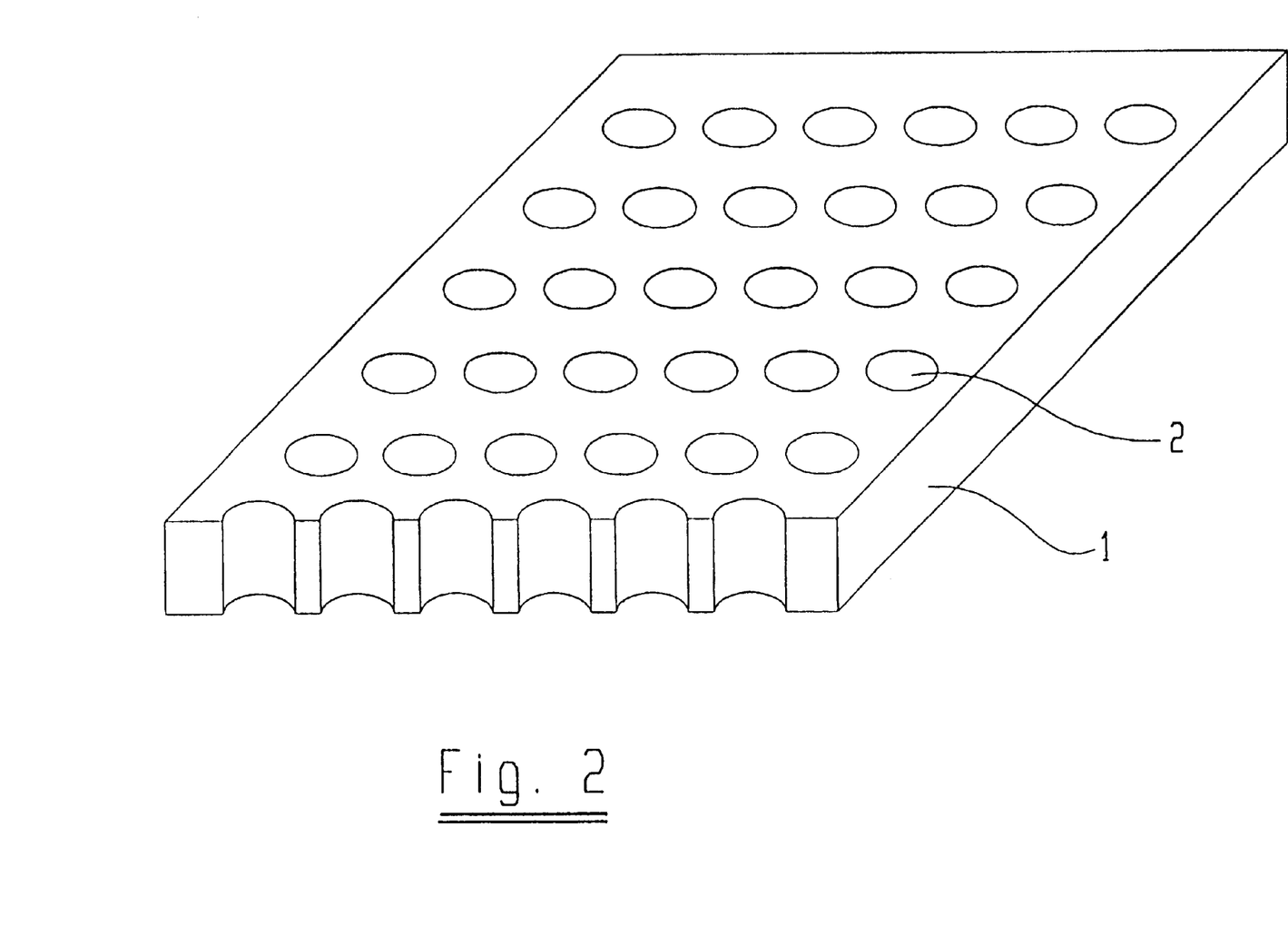
FIG. 2, a perspective top view of a filter produced in accordance with the invention.

The diameter of this through-hole essentially depends on the doping of the blank, since it influences the electrical field formed in the blank. The weaker the doping, the smaller the diameter, since the etching process then takes place predominantly in the bottom of the recess 2 and the side walls of the recess are etched away to a lesser degree. A completely etched filter is schematically shown in FIG. 2.

A regular hole structure is obtained, according to another exemplified embodiment of the invention, by applying a perforation mask on the upper side of the substrate in a first operation, and chemically etching the substrate on the holes of the perforation mask in a traditional manner. In this way, a surface with uniformly arranged and thus structured recesses is produced for the subsequent electrochemical etching; the later etching process described above is then carried out on these recesses.

Figure 3:
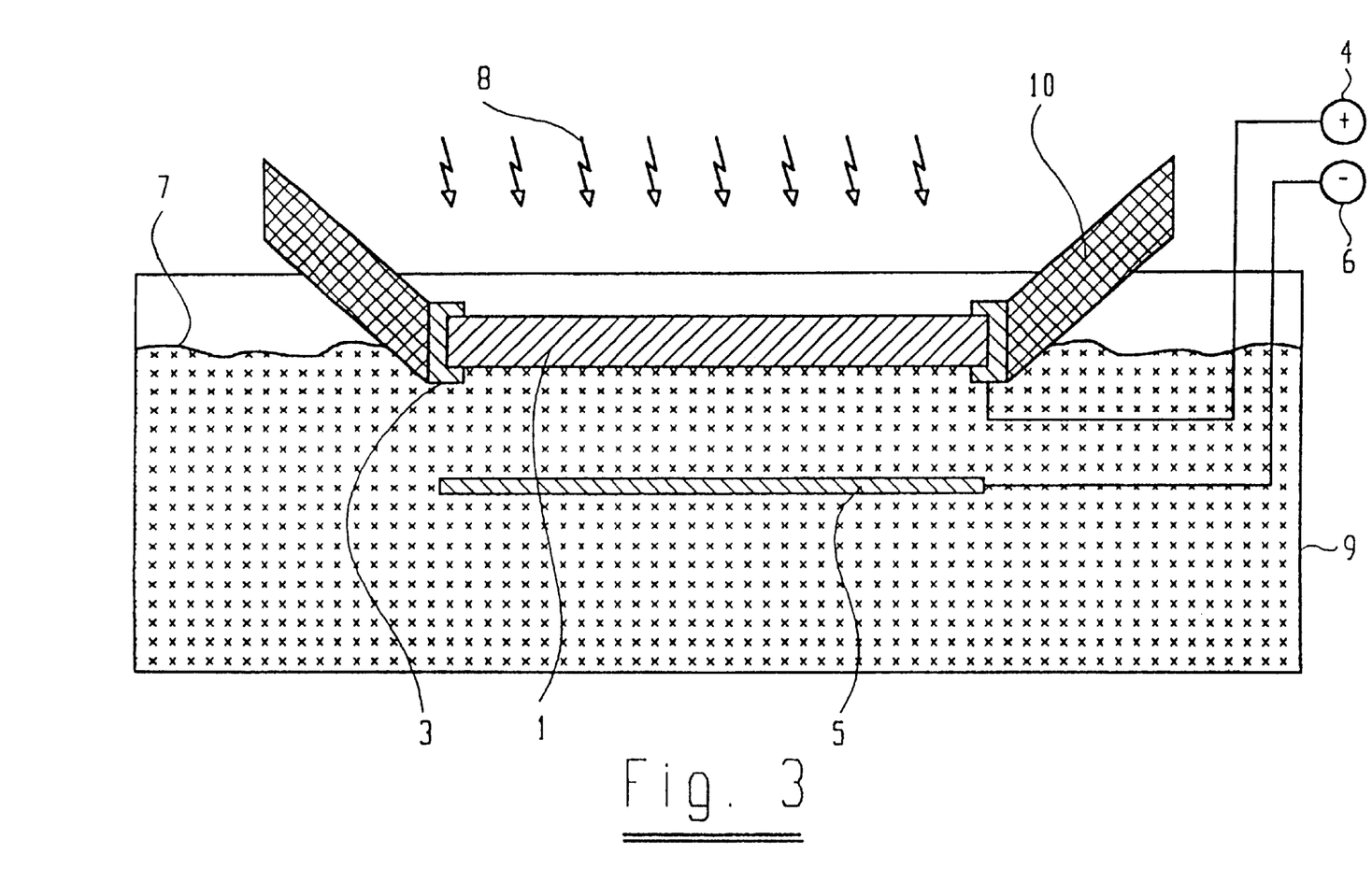
FIG. 3, a filter with a holding element.
Figure 4A:
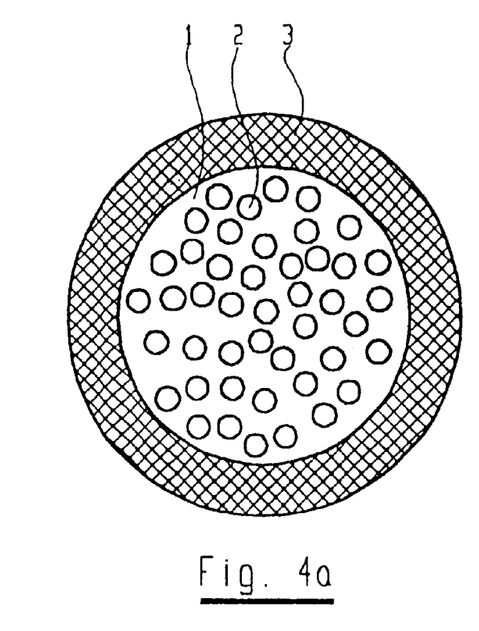
FIGS. 4a to 4g, various top views and a cross section of filters produced in accordance with the invention, with various shapes of blanks and holding elements.
Figures 4B, 4D:
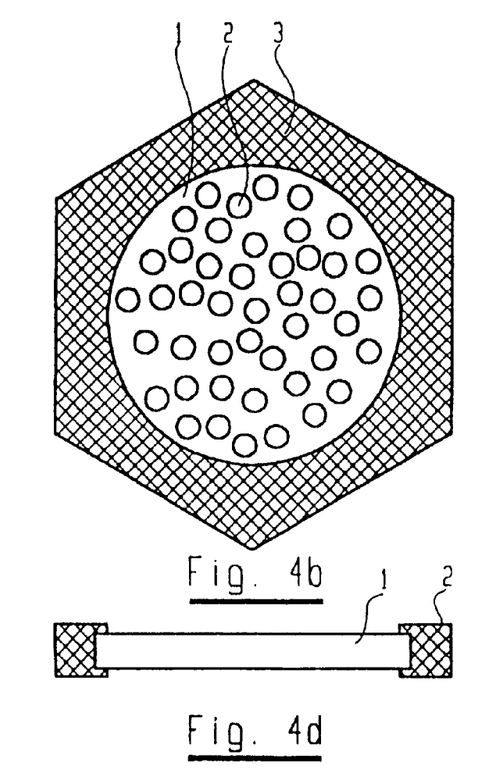
Figure 4C:
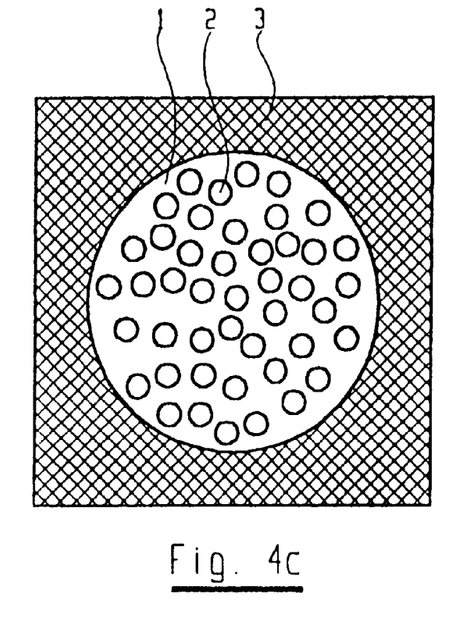
Figure 4E:
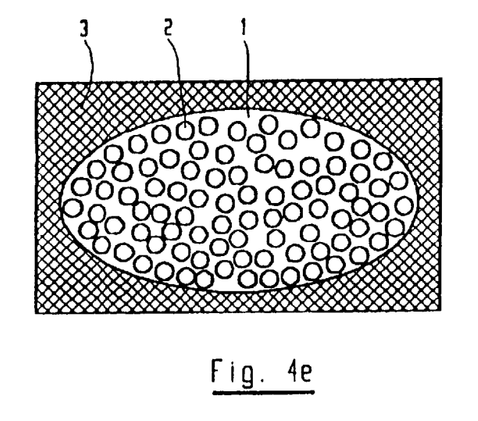
Figure 4F:
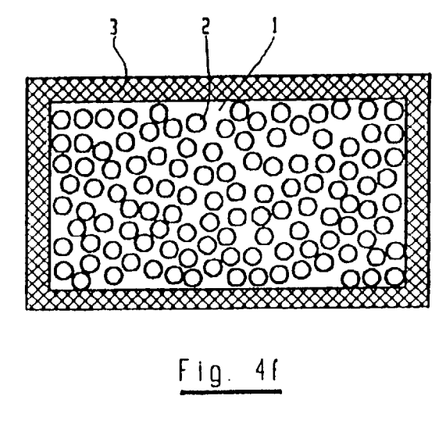
Figure 4G:
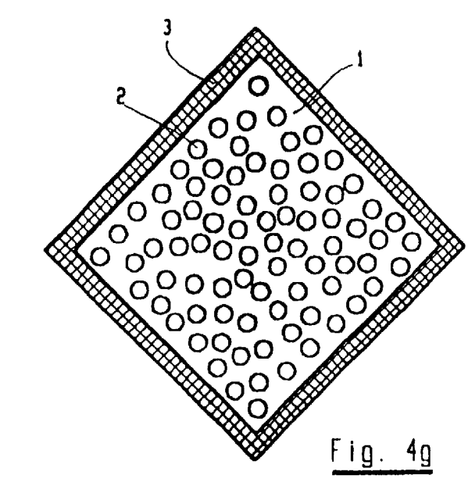

FIG. 3 schematically shows a blank 1, whose holding element 3 is connected with the anode 4 of a current source. The holding element here has boundary areas 10, which protrude at an angle upwards from the etching solution 7 and shield, from the etching liquid, the back side of the blank, turned away from the etching solution 7. The boundary areas 10 can, however, also protrude vertically from the etching liquid. In this way, the back side of the blank is not wetted by the etching liquid and the blank can be immersed correspondingly deeper into the etching solution, which is found in a container 9. The aforementioned back side of the blank can then be irradiated with light 8 during the etching process for the production of the minority charge carriers. The boundary areas 10 are made of a material which is resistant with respect to the etching solution. If a hydrofluoric acid-containing solution is used as the etching agent, then, for example, polyethylene, platinum, or the like, is recommended. The boundary areas 10 can be made of the same material as the holding element 3. They can, however, also be made of another material and need not absolutely be electrically conductive, since the electrical connection can also be done directly on the holding element 3.

FIG. 4 shows various shapes of the holding element. In blank 1, which is circular in top view, the holding element 3 has an annular shape in FIG. 4a, hexagonal in FIG. 4b, and square in FIG. 4c. In FIGS. 4e and 4f, the holding element 3 is rectangular, wherein blank 1 in FIG. 4e is ellipsoidal and in FIG. 4f, rectangular. FIG. 4g shows a blank 1 and a holding element 3, which are square. Of course, shapes other than the ones shown are also possible.

Generally, the holding element is to be selected preferably so that it has the suitable shape already for the later installation of the filter into tubes, channels, etc. Furthermore, it is possible to first affix a holding element suitable for the lower installation after the etching process on the filter. The holding elements can therefore be affixed before or after the etching process.

Figure 5:
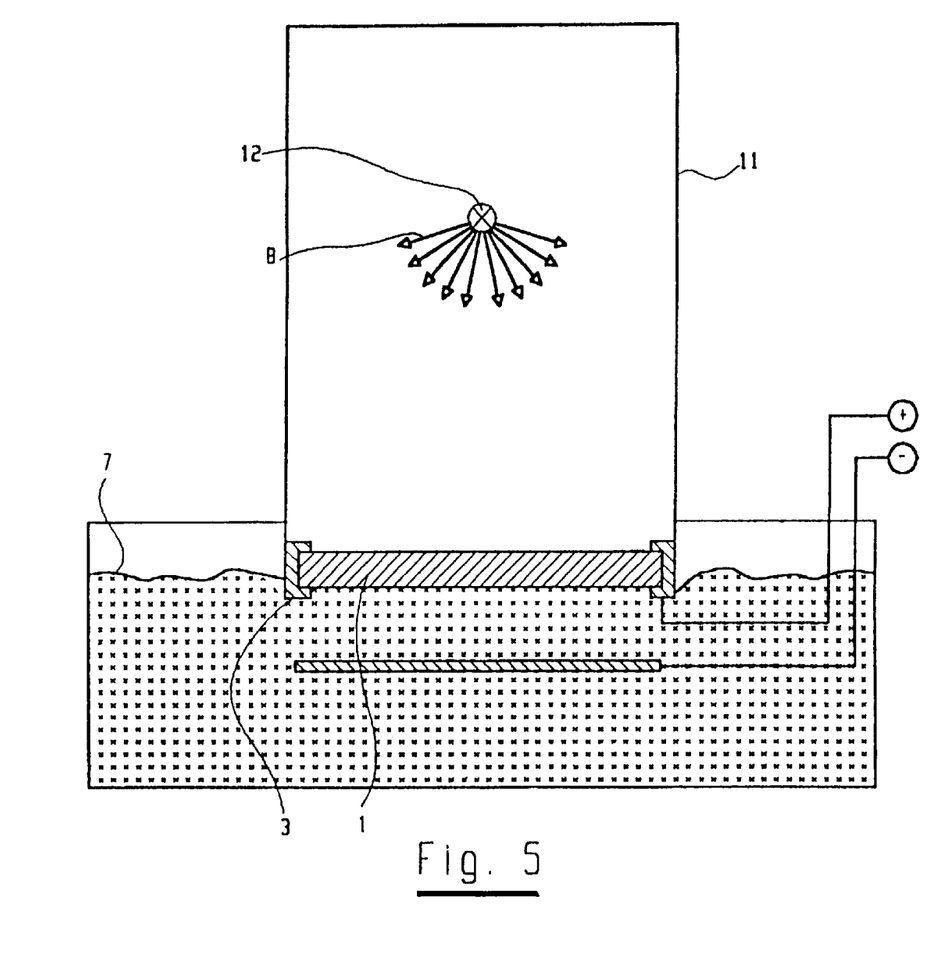
FIG. 5, a holding element with a circular cylindrical shield.

FIG. 5 shows a holding element 3 with a circular-cylindrical shield 11, which surrounds blank 1 in top view. A light source 12, from which the light arrows 8 proceed, is located within the shield 11. The shield 11 can be metallized on the inside, wherein the light power that strikes blank 1 is increased. The shield 11 can be connected, as one piece, with the holding element 3, and after the etching process, can be removed from blank 1. Alternately, it is also possible to construct the shield 11 as a separate part, which is removed from the holding element 3 after the etching process and used once again.

Figure 6:
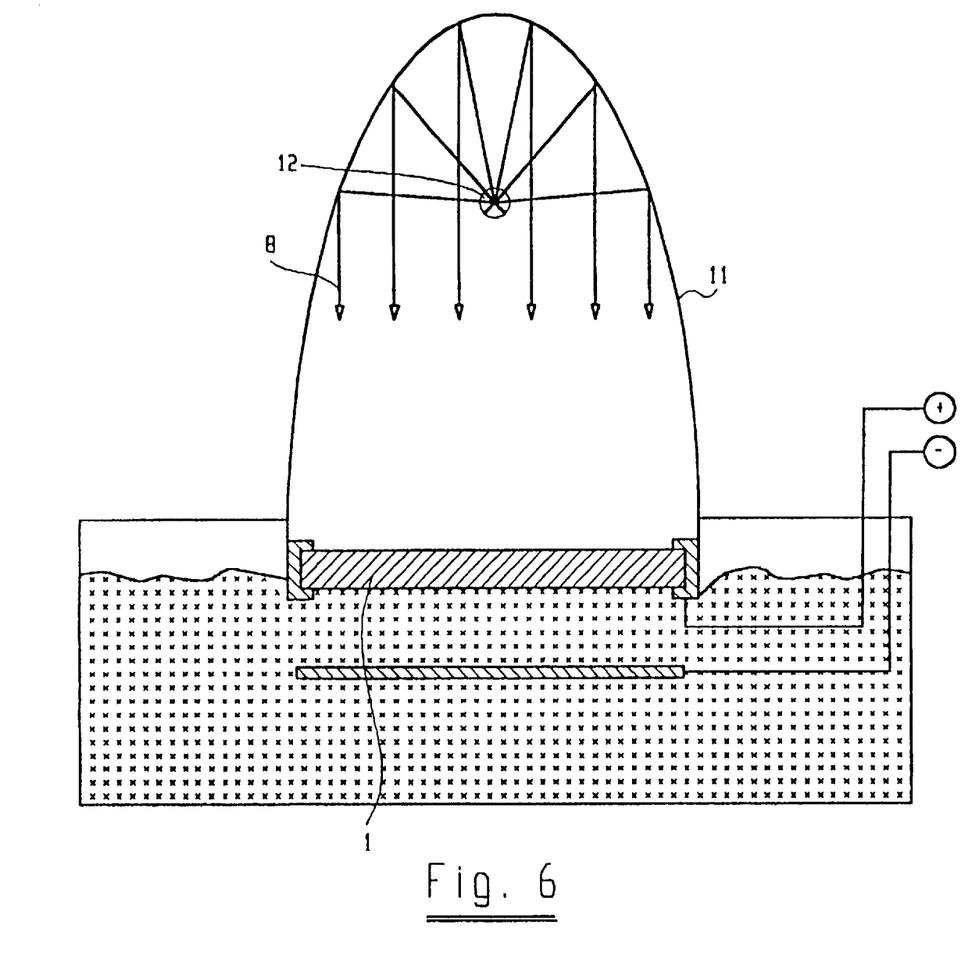
FIG. 6, a holding element with a parabolic shield.

FIG. 6 shows an exemplified embodiment, in which the shield 11 has the shape of a paraboloid, wherein the light source 12 is located in its focal point. In the exemplified embodiment shown, the paraboloid is metallized on its inside, so that the light rays given off by the light source 12 are reflected so that they strike blank 1, parallel to one another and vertically. In this way, a very uniform and homogeneous illumination of blank 1 can be attained.

Figure 7A:
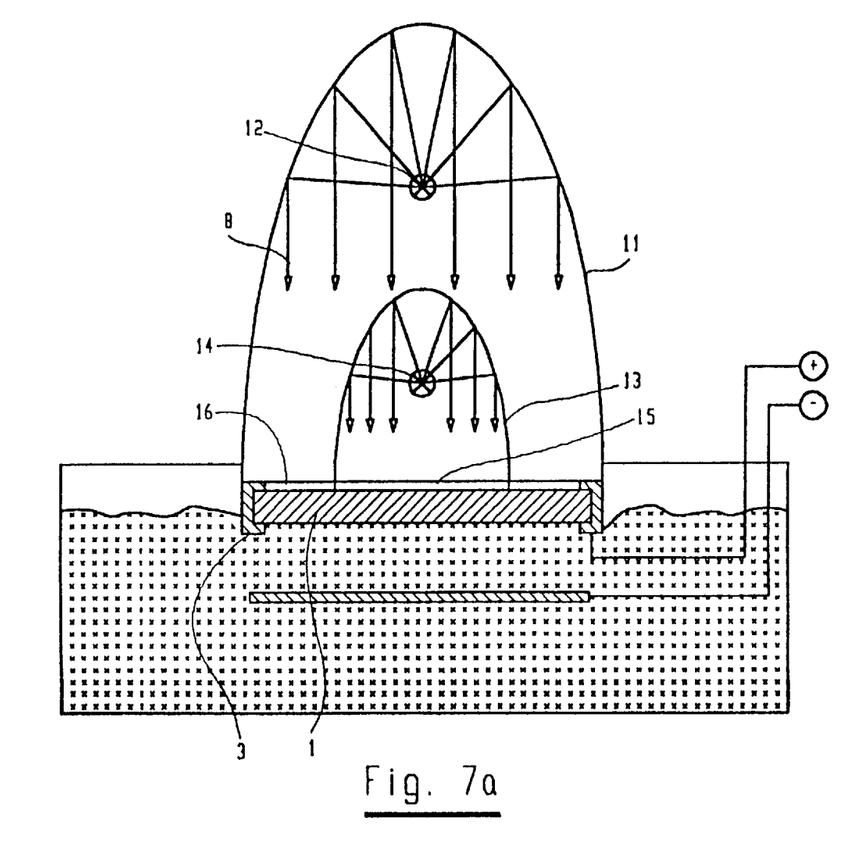
FIGS. 7a and 7b, a holding element with two parabolic shields, boxed in one another.

FIG. 7a shows an exemplified embodiment similar to FIG. 6, in which, within the parabolic shield 11, a second shield 13 is located, in whose focal point a second light source 14 is located, which, for example, can have an intensity different from that of light source 12. In this way, a circular illumination area 15 and an annular illumination area 16, surrounding the circular area, are produced on blank 1. As a result of the different illumination intensities in the illumination areas 15 and 16, two filter areas with correspondingly different filtering characteristics—such as pore diameters or pore densities—are obtained during the etching process. The inside shield 13 can also be metallized on its inside and perhaps also on its outside.

Figure 7B:
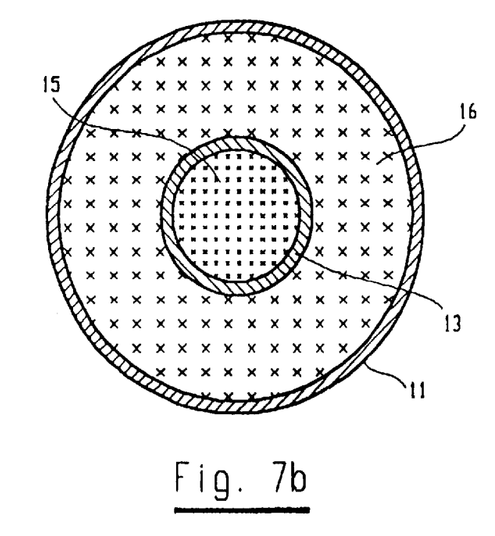

FIG. 7b shows a top view on FIG. 7a in sectional representation, in which the two illumination areas 15 and 16 are marked with different shadings.

Alternately to the parabolic shields 11 and 13, boxed into one another and shown in FIG. 7a, several—for example, box-shaped—shields can also be placed boxed into one another or next to one another, wherein corresponding rectangular illumination areas, which lie "in one another" or next to one another, are produced on blank 1.

Figure 8:
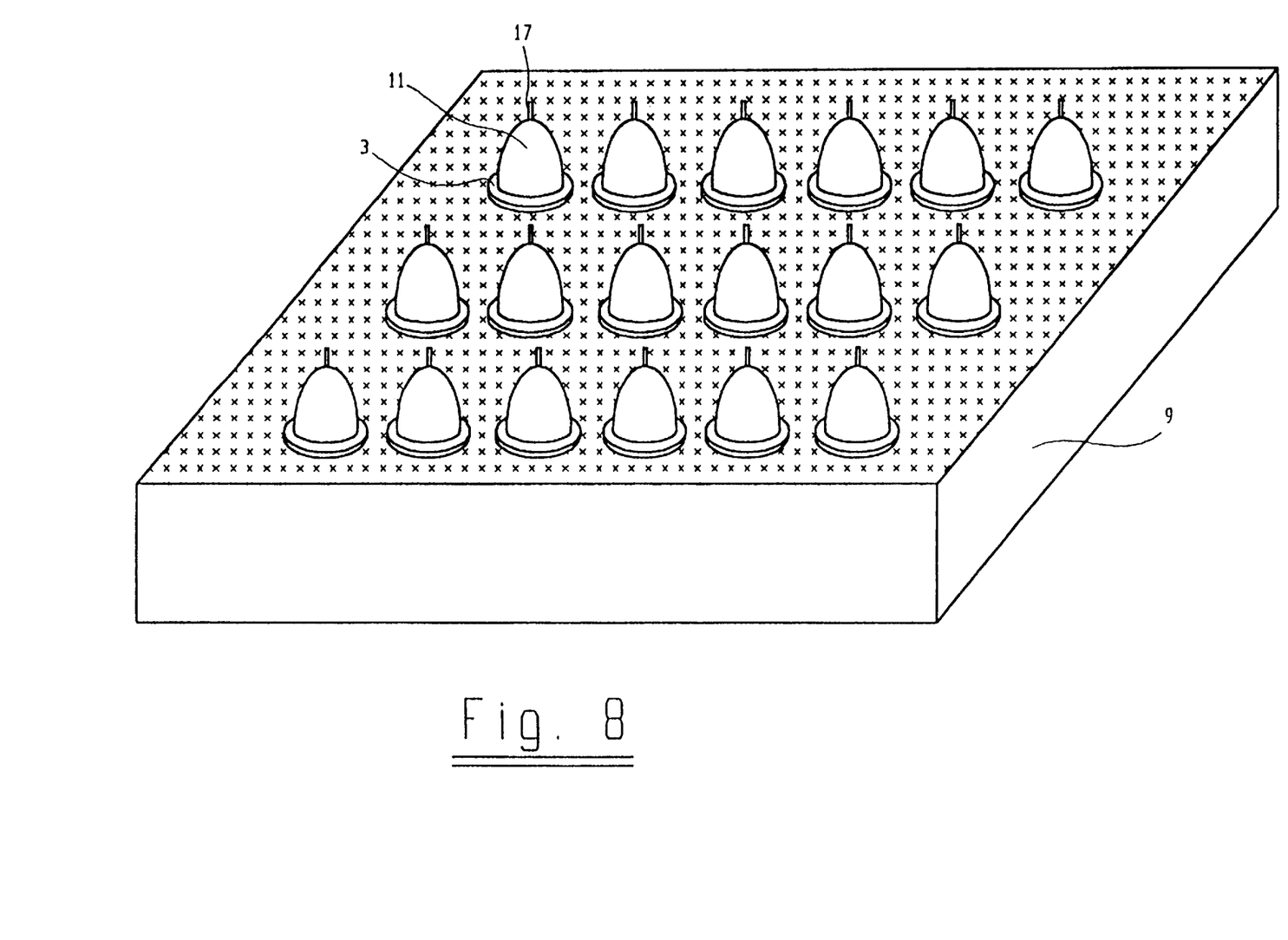
FIG. 8, a batchwise filter production.

FIG. 8 shows a batchwise production of filters, in which a large number of blanks, which are affixed to identical holding elements 3 or shields 11, can be immersed, in one operation, in a container 9, filled with etching liquid. To raise and immerse the blanks, pins 17, which are connected with a lifting device, which has not been depicted, are provided on the outside of the shields 11. The electrical connections are not depicted in FIG. 8 either.

Figure 9:
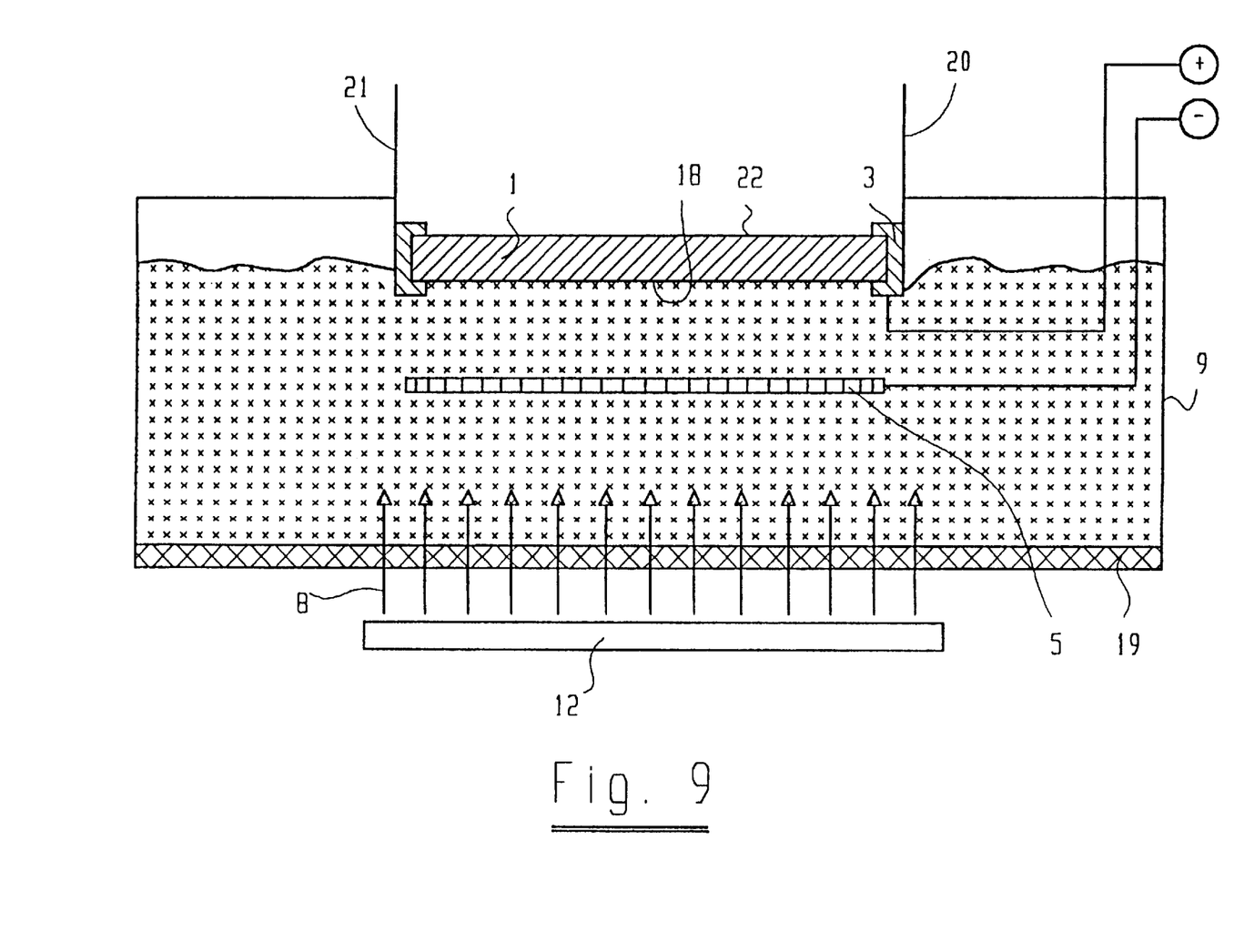
FIG. 9, a diagrammatic sketch, in which the blank is illuminated on the side wetted with solution liquid.

FIG. 9 shows an exemplified embodiment, in which blank 1 is illuminated on the side 18 that is wetted with etching liquid, wherein the light source 12 is located outside the container 9. In this regard, the container 9 has a bottom 19, which is made of transparent material so that the light rays depicted by the light arrows 8 can enter the interior of the container 9 and illuminate blank 1. The counterelectrode 5 can be a grid, for example, wherein a good illumination of the side 18 of blank 1 is attained. Here, the holding element 3 with its side walls 20 and 21 also has the function of protecting the side 22 of blank 1, opposite side 18, from being wetted with the etching liquid.

The light source 12 located outside the container 9 can be a diffusely illuminating "luminescent disk," for example, or a "luminescent surface," formed by several illuminating tubes or other light sources, for example. Such an arrangement of the light source 12 can reduce the structure size of the device. As an alternative to the exemplified embodiment shown in FIG. 9, this arrangement can be used also in the batchwise production of filters shown in FIG. 8, wherein all the blanks can be irradiated with only one or a few light sources 12, located outside the container 9.

What is claimed is:

1. A method for producing a filter comprising the steps of:
   providing a blank of etchable semiconductor material having a first side and a second side,
   affixing a holding element to said blank, the holding element being chemically resistant to an etching solution,
   connecting said blank to a current source,
   illuminating at least one of the first and second sides of said blank with light,
   immersing the holding element and said blank in the etching solution until only the first side of said blank is wetted, the second side being uncovered and unwetted, so that the first side is etched electrochemically,
   the holding element being affixed to said blank such that contact areas between the holding element and said blank remain free of the etching solution.

2. A method according to claim 1 wherein the holding element includes a shield having a light source located therein, the shield located on the second side opposite the first side of said blank.

3. A method according to claim 2 wherein the shield is coated with a light-reflecting coating.

4. A method according to claim 2 wherein the shield is circular-cylindrical.

5. A method according to claim 2 wherein the shield is formed as a paraboloid and wherein the light source is located in the focal point of the paraboloid.

6. A method according to claim 1 wherein the holding element includes a plurality of shields, each shield having a light source located therein and located on the second side opposite the first side of said blank.

7. A method according to claim 1 wherein said blank is a silicon plate, the method further comprising the step of doping said blank with a doping substance concentration in the range of $10^{15}$ to $10^{19}$ cm$^{-3}$.

8. A method according to claim 7 wherein the blank is n-doped and is connected with an anode of the current source.

9. A method according to claim 1 wherein the etching solution is hydrofluoric acid with a fluoride content in the range of 2–25%.

10. A method according to claim 1 wherein said blank is covered with a perforation mask having holes therein before the electrochemical etching and is etched chemically in an area of the holes of the perforation mask.

11. A method according to claim 1 wherein the light source is located outside a container filled with the etching solution, the container having a transparent wall, the light source being located so that the light penetrates the transparent wall and the etching solution and illuminates the first side of said blank.

12. A method for producing a filter comprising the steps of:
   providing a plurality of blanks of etchable semiconductor material, each blank having a first side and a second side,
   affixing a holding element to each blank, the holding element being chemically resistant to an etching solution,
   connecting each blank to a current source,
   illuminating at least one of the first and second sides of each blank with light,
   simultaneously immersing each blank in the etching solution until only the first side of each blank is wetted, the second side of each blank being uncovered and unwetted, so that the first side is etched electrochemically,
   the holding element being affixed to each blank such that contact areas between the holding element and each blank remain free of the etching solution.

* * * * *